United States Patent [19]

May

[11] Patent Number: 5,466,184
[45] Date of Patent: Nov. 14, 1995

[54] DEVICE FOR REMOVING SURFACE AIR IN CASINGS

[75] Inventor: Dennis J. May, Pittsboro, N.C.

[73] Assignee: Delaware Capital Formation, Inc., Apex, N.C.

[21] Appl. No.: 212,007

[22] Filed: Mar. 11, 1994

[51] Int. Cl.[6] .................................................. A22C 11/00
[52] U.S. Cl. ........................... 452/38; 452/30; 452/37
[58] Field of Search ......................... 452/38, 37, 30, 452/21, 27, 28, 33, 35

[56] References Cited

U.S. PATENT DOCUMENTS

| | | | |
|---|---|---|---|
| 3,751,764 | 8/1973 | Dobbert | 17/35 |
| 4,142,273 | 3/1979 | Gay | 17/41 |
| 4,675,945 | 6/1987 | Evans et al. | 17/33 |
| 4,920,611 | 5/1990 | Townsend | 452/35 |
| 4,958,412 | 9/1990 | Stanek | 452/38 |
| 5,104,348 | 4/1992 | Powers et al. | 452/37 |
| 5,203,735 | 4/1993 | Stanek | 452/38 |

Primary Examiner—Willis Little
Attorney, Agent, or Firm—Banner & Allegretti, Ltd.

[57] ABSTRACT

A product stuffing horn assembly includes a vacuum ring affixed near the outlet end of the stuffing horn over which shirred casing may flow. The vacuum ring is connected via appropriate tubing to a vacuum source so that air may be withdrawn from the region adjacent the outlet end of the stuffing horn and within the discharged casing.

3 Claims, 3 Drawing Sheets

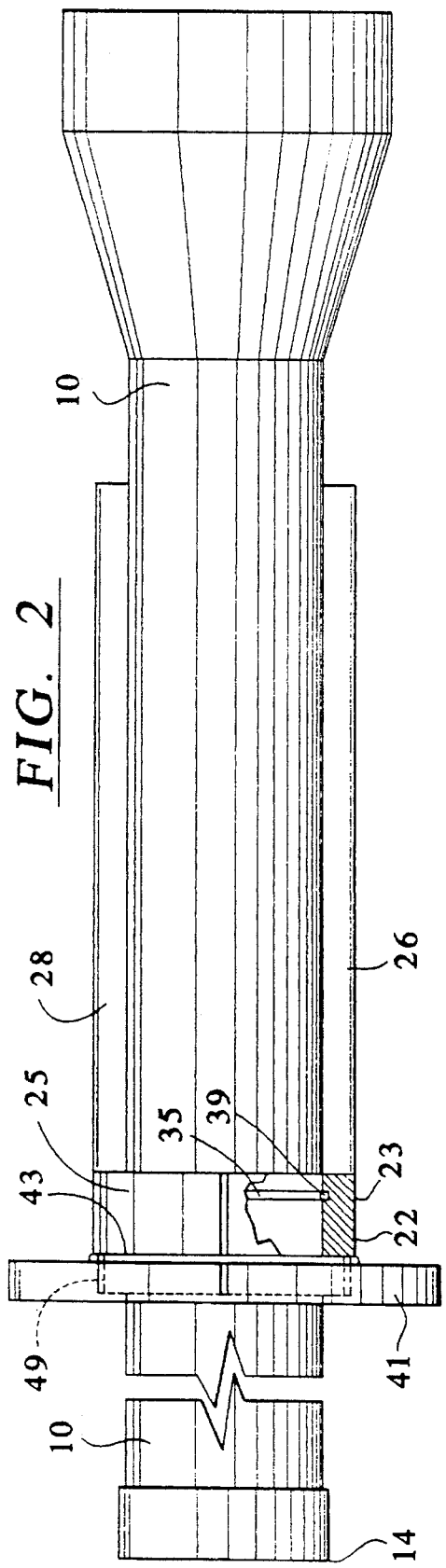
*FIG. 2*
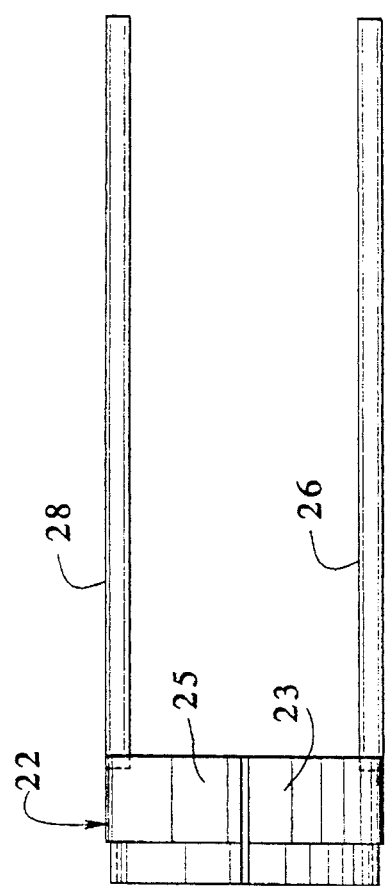
*FIG. 6*
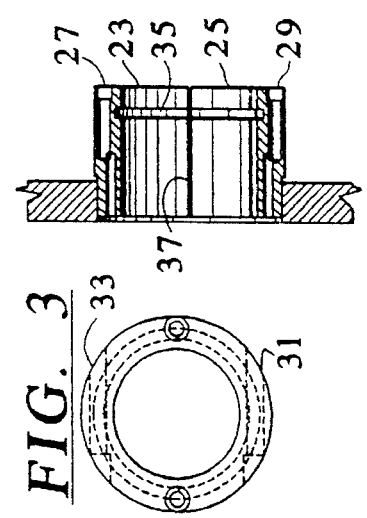
*FIG. 3*   *FIG. 5*
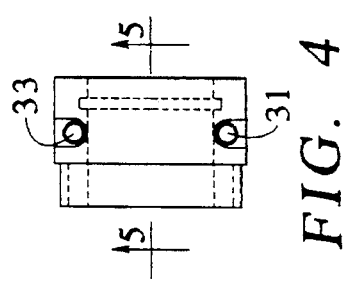
*FIG. 4*

DEVICE FOR REMOVING SURFACE AIR IN CASINGS

BACKGROUND OF THE INVENTION

This invention relates to an improved product stuffing horn assembly and more particularly to a mechanism for removing air from casings which are being filled with product discharged from a stuffing horn.

Utilization of stuffing horns for discharge of products, such as food products including comminuted meat, into casing material has been a technique utilized in the food packaging and other industries for some time. Typically, shirred or rucked, cylindrical food casing material is fitted over an elongated cylindrically shaped horn. The open end of the casing at the open end of the stuffing horn is sealed. A product is then discharged from the open end of the horn to fill the casing as the shirred casing is removed from the horn. Various mechanisms have been devised to control the rate and tension of discharge of the casing from the end of the stuffing horn. For example, Dobbert in U.S. Pat. No. 3,751,764 discloses such a mechanism. U.S. Pat. No. 4,142,273 also discloses a stuffing horn construction for a sausage making machine along with a mechanism for controlling shirred casing as it is discharged from a stuffing horn. U.S. Pat. No. 4,675,945 also discloses such a construction wherein shirred casing is positioned on a stuffing horn and discharge or removal of casing from the horn is controlled by a braking mechanism.

It has been noted that upon the discharge of shirred casing from a stuffing horn when filling the casing, air may be entrained within the casing and may affect the mix and pattern of food or material being directed into the casing. Thus, there has developed a need for a procedure or mechanism which will work cooperatively in conjunction with an apparatus for controlling the discharge of shirred casing to remove air or control the air that is entrained with the shirred casing as it is fed from the end of the stuffing horn.

SUMMARY OF THE INVENTION

Briefly, the present invention comprises a stuffing horn assembly for filling a flowable product into a flexible casing wherein the stuffing horn has an outlet for directing the product into the casing. The horn is of the type with an elongated cylindrical body for receipt of rucked or shirred casing. The horn assembly includes a vacuum ring affixed to the horn body and spaced from the outlet end so that the shirred casing may fit over the ring and the discharge outlet. Product discharged through the horn may then flow into the shirred casing as it is withdrawn from the horn over the vacuum ring. A vacuum conduit connects through a passage in the ring to a vacuum source so that air or other gases within the chamber formed between the stuffing horn and the casing is withdrawn or discharged.

Thus, it is an object of the invention to provide a mechanism for removal of air or gases from shirred casing as it is discharged from the end of an elongated stuffing horn.

It is a further object of the invention to provide a simplified mechanism for use in combination with stuffing horns of the type presently available, which mechanism permits easy and efficient removal of air entrained within a casing as it is being discharged from the stuffing horn for receipt of food products or other products.

Yet a further object of the invention is to provide an improved stuffing horn assembly for filling of flowable product more efficiently into shirred casing discharged from the stuffing horn.

These and other objects, advantages and features of the invention will be set forth in the detailed description that follows.

BRIEF DESCRIPTION OF THE DRAWING

In the detailed description which follows reference will be made to the drawing comprised of the following figures:

FIG. 2 is a side elevation of the stuffing horn of the invention depicted in FIG. 1;

FIG. 3 is an end view of the vacuum ring associated with the improved vacuum device of the invention;

FIG. 4 is a plan view of the ring of FIG. 3;

FIG. 5 is a sectional view of the ring of FIG. 4 substantially along the lines 5—5;

FIG. 6 is a side elevation of the assembled vacuum ring and conduits of the invention.

DESCRIPTION OF THE PREFERRED EMBODIMENT

General Description

Figure 1:
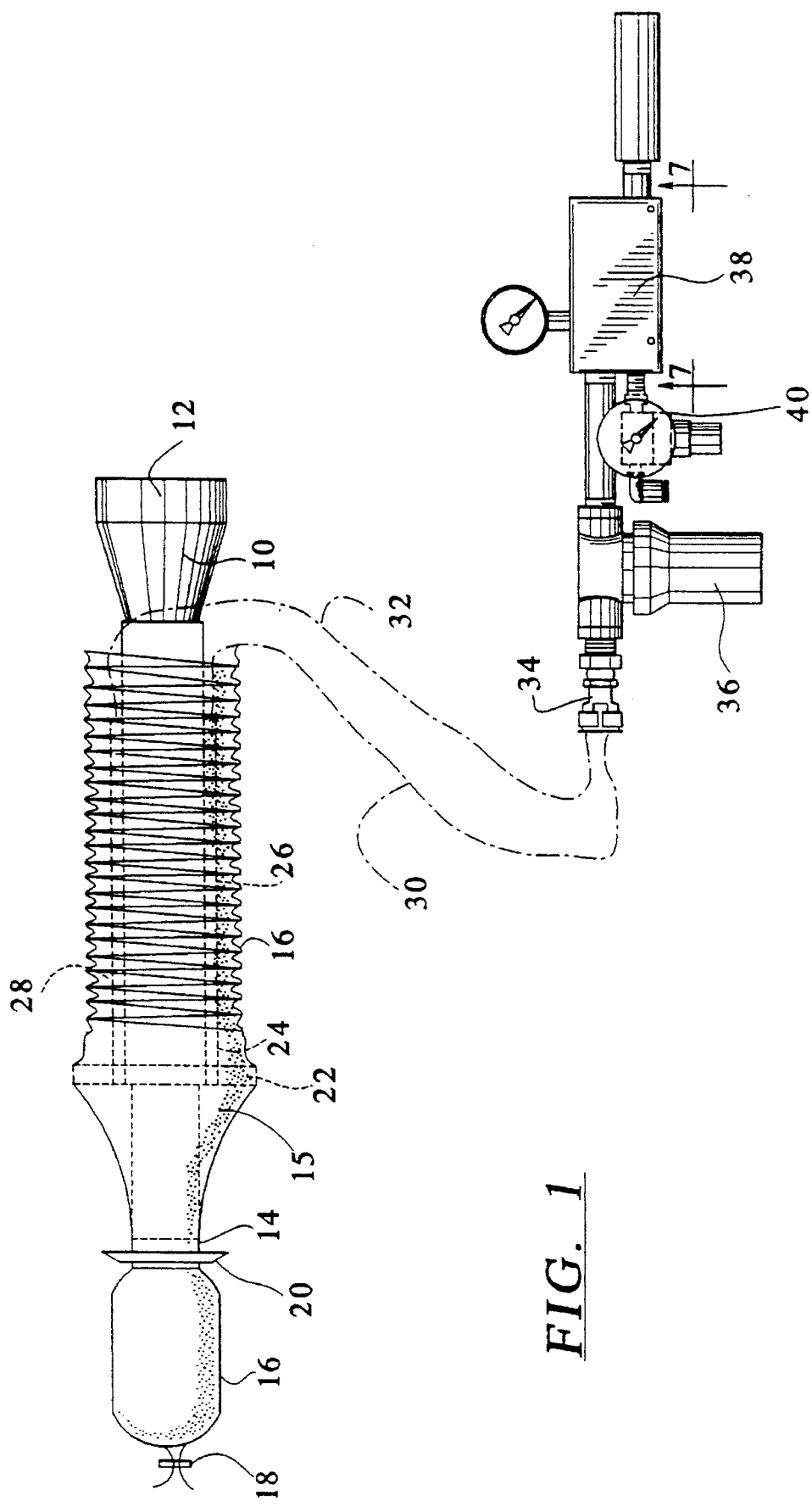
FIG. 1 is a side view illustrating the improved stuffing horn assembly of the invention.
Figure 7:
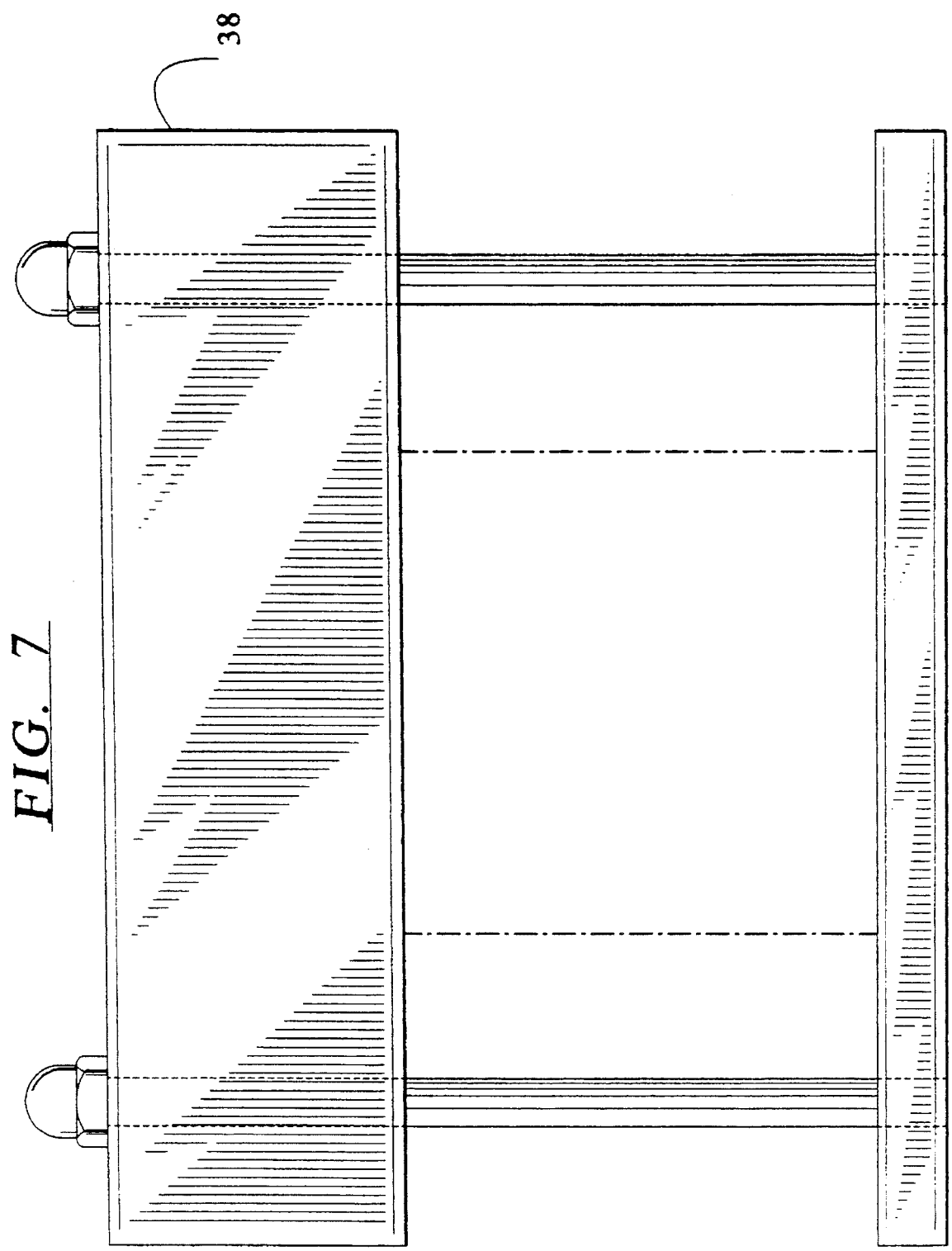
FIG. 7 is a side elevation of the vacuum assembly.

FIG. 1 illustrates the general overall construction of the improved stuffing horn assembly of the present invention. There as shown, a typical stuffing horn 10 includes a product inlet 12 into which flowable material such as sausage or other food products is directed from a product pump (not shown). The stuffing horn 10 is an elongated, cylindrical, stainless steel, tubular member. The horn 10 terminates at an outside or discharge end 14. The horn 10 is adapted to receive shirred or rucked casing 16. The shirred or rucked casing 16 is typically clipped or sealed at its outside end by means of a sealing member or clip 18. The shirred casing 16 is discharged or removed from the horn 10 and feeds between the horn 10 and a braking mechanism 20 so that the flowable material or product from the horn 10 will flow into the casing 18. Periodically, as disclosed in some of the prior art references, the casing material 16 is constricted and clipped or sealed. In this manner, sausages, for example, are made.

The improvement of the present invention relates specifically to an inner vacuum ring 22 which is fixed to the stuffing horn 10. Flow passages 24 through the ring 22 connect to tubes 26 and 28. The tubes 26 and 28 lie tightly against the stuffing horn 10 and extend in the axial direction so that the shirred or rucked casing 16 may fit thereover. The tubes 26 and 28 are connected to flexible tubes 30 and 32 respectively. These are, in turn, attached to a fitting or a coupling 34 which connects via a conduit through a filter 36, vacuum assembly 38 and pressure regulator 40. The vacuum assembly 38 provides for controlled vacuum or exhaust through the lines 30 and 32. Thus, the casing 16 which seals over the ring 22 and against the front end 14 of the stuffing horn 10 forms a chamber 15 from which air or other gaseous materials are withdrawn. This provides for improved operation and filing of the casing material 16 as it is pulled through the brake construction 20. The device effectively removes the surface air associated with the movement of the shirred or rucked casing through the brake and provides an improved product appearance as well as improved packaging efficiency.

Referring to the remaining Figures, there is depicted in greater detail the construction of the horn 10 and the other various component parts comprising the improved mechanism. Specifically, the ring 22 is comprised of first and second semi-cylindrical members 23 and 25. These members 23 and 25 include throughbore passages 27 and 29. The rings 23 and 25 are fastened together by means of bolts 31 and 33. The rings 23 and 25 are thus sealed against the outside surface of the stuffing tube 10. An O-ring 39 fits within a circumferential groove 35 defined on the inside surface of the ring members 23 and 25 to effect the seal. An elastomeric gasket or sealing material 37 may be inserted between the ring members 23 and 25 to further enhance the seal. The ring members 23 and 25, as depicted in FIGS. 3 through 6, typically are constructed from a stainless steel material.

As shown in FIG. 2, the ring members 23 and 25, upon attachment to the stuffing horn 10, are positioned or define a land 49. An annular ring 41 is mounted on the land 49 and an O-ring 43 on the land 49 ensures the seal between the annular ring 41 and the ring members 23 and 25. The outer vacuum ring member 41 may be typically manufactured from Delrin plastic or a similar material. This material is chosen in order to enable the rucked or shirred casing to form a good seal against the surface thereof while having sufficient lubricity so that the casing may be withdrawn over that surface of the ring member 41. Note, that the ring member 41 is spaced from the discharge end 14 of the horn 10. Thus, there is provided a space or volume from which the air entrained or contained by the casing 16 is withdrawn. The conduits 26 and 28 are fitted into the separate ring member 23 and 25. Flexible tubing 30, 32 then connects to the separate rigid stainless steel conduits 26 and 28.

With the construction of the invention as discussed above, it is possible to maintain a lower pressure or vacuum situation in the region 15 defined between the casing 16 and the horn 10. As stated above, this improves product flow from the horn 10 and also improves the ease with which the shirred casing moves through the brake mechanism and becomes filled with product.

While there has been set forth a preferred embodiment of the invention, it is to be understood that variations may be utilized without departing from the true spirit and scope of the invention. Thus, the configuration of the ring members may be altered. The number of components forming the ring members may be changed. The specific arrangement of the connection of the vacuum tubes may also be varied. Therefore, the invention is to be limited only by the following claims and their equivalents.

What is claimed is:

1. A product stuffing horn assembly for filling a flowable product into a flexible casing to provide a product, the product stuffing horn assembly comprising, in combination:

a stuffing horn having a product outlet end for directing product therefrom, said stuffing horn also having an outer surface, an outer diameter, and defining a longitudinal axis, said stuffing horn further having an elongated horn body which extends axially, along said longitudinal axis, for receipt of rucked casing that may be withdrawn over the product outlet end as product is discharged from the stuffing horn at the product outlet end to fill the casing;

a vacuum ring affixed to the stuffing horn body against the outer surface of the stuffing horn and spaced from the product outlet end of the stuffing horn, said vacuum ring being annular, having a face toward the product outlet end of the stuffing horn generally perpendicular to the stuffing horn axis, an outer diameter greater than the outer diameter of the stuffing horn and less than the maximum diameter over which the rucked casing may pass, and having a generally smooth circular outside surface for coacting with casing thereover to generally provide a seal therebetween, said vacuum ring having at least one vacuum passageway therethrough from the vacuum ring face toward the opposite end of the vacuum ring, said vacuum ring otherwise forming a barrier to fluid flow;

a vacuum source; and a vacuum conduit from the vacuum passageway of the vacuum ring to the vacuum source, said vacuum conduit positioned generally against the stuffing horn body to permit rucked casing to be positioned over the vacuum conduit and stuffing horn body;

the stuffing horn, vacuum ring, vacuum source and vacuum conduit sized and cooperating such that the casing rucked on the stuffing horn body may be fitted over the vacuum ring for withdrawal at the stuffing horn product outlet end and a region is defined between the casing fitted over the vacuum ring and the stuffing horn that is subject to at least partial vacuum to thereby withdraw air and gases from the casing as it is being filled;

wherein the vacuum ring comprises an inner, annular member sealed on the horn comprised of first and second semi-cylindrical ring members fastened together and sealed against the outside surface of the stuffing horn, which define a land, and an outer, annular member mounted on the land and sealed to the inner, annular member.

2. The product stuffing horn assembly as in claim 1 further comprising an O-ring between the ring members and the outside surface of the stuffing horn, providing the sealing between the inner, annular member and the outside surface of the stuffing horn.

3. The product stuffing horn assembly as in claim 1 further comprising an O-ring on the land between the ring members and the outer, annular member, providing the sealing between the outer, annular member and the inner, annular member.

* * * * *